AUTOMATICALLY REVERSING MAGNETIC RECORDING AND REPRODUCING SYSTEM

Filed Nov. 15, 1965

5 Sheets-Sheet 1

INVENTORS
Takahiro Nakamura
Yoshio Yabuno
Akiyoshi Kameda
Shozo Aratani
BY
Stevens, Davis, Miller & Mosher
ATTORNEYS INVENTORS
Takahiro Nakamura
Yoshio Yabuno
Akiyoshi Kameda
Shozo Aratani BY
Stevens, Davis, Miller & Mosher
ATTORNEYS INVENTORS
Takahiro Nakamura
Yoshio Yabuno
Akiyoshi Kameda
Shozo Aratani
BY
Stevens, Davis, Miller & Mosher ATTORNEYS June 2, 1970 TAKAHIRO NAKAMURA ET AL 3,515,391

AUTOMATICALLY REVERSING MAGNETIC RECORDING AND REPRODUCING SYSTEM

Filed Nov. 15, 1965 5 Sheets-Sheet 4

INVENTORS
Takahiro Nakamura
Yoshio Yabuno
Akiyoshi Kameda
Shozo Aratani

BY
Stevens, Davis, Miller & Mosher
ATTORNEYS

INVENTORS
Takahiro Nakamura
Yoshio Yabuno
Akiyoshi Kameda
Shozo Aratani
BY
Stevens, Davis, Miller & Mosher ATTORNEYS

3,515,391
AUTOMATICALLY REVERSING MAGNETIC RECORDING AND REPRODUCING SYSTEM

Takahiro Nakamura, Hiraoka-shi, Yoshio Yabuno, Toyonaka-shi, Akiyoshi Kameda, Moriguchi-shi, and Shozo Aratani, Suita-shi, Japan, assignors to Matsushita Electric Industrial Co., Ltd., Kadoma-shi, Osaka, Japan, a corporation of Japan Filed Nov. 15, 1965, Ser. No. 507,895
Claims priority, application Japan, Nov. 19, 1964 (utility model), 39/90,480; Nov. 20, 1964 (utility model), 39/90,496
Int. Cl. G11b 5/02
U.S. Cl. 274—4 7 Claims

ABSTRACT OF THE DISCLOSURE

A magnetic recording and reproducing system including a plurality of record tracks on a magnetic tape in the direction of its travel, which comprises detecting a signal preliminarily provided on the tape, exciting a relay by said detected signal, driving a motor by the operation of the relay, and changing the positional relation between said magnetic tape and a magnetic head by cam means arranged to be driven by said motor and control means adapted to interlock with said cam means to thereby effect the change of record tracks and the change of the directions of travel of the tape.

This invention relates generally to magnetic recording and reproducing systems and more particularly to those of the type including a magnetic tape, magnetic heads, and means for moving said magnetic tape relative to said magnetic heads to produce a plurality of record tracks on said magnetic tape in parallel to its direction of travel.

More specifically, the present invention is concerned with automatic tape control devices for this type of magnetic recording and reproducing system which are relatively simple and inexpensive.

With magnetic tape recording and reproducing systems including as major components a takeup reel and a payoff or supply reel for the magnetic tape, magnetic heads fixed to a base plate in a position intermediate said tape reels for sliding contact with the magnetic tape, and a mechanism for driving the tape, various devices have previously been proposed and put into practice for automatically reversing the direction of tape travel at its end, including simple devices for lower tape-speed systems and complicated and expensive ones for higher tape speed systems. Also, for the changing or selection of the record tracks formed or to be formed on the tape widthwise thereof, different methods have previously been in use. In one typical method, magnetic heads corresponding in number to the tracks have been employed with electrical head switching means. In any case, the devices for lower tape speeds could not be employed for any higher tape speeds and those for higher tape speeds have been deficient in that they are complicated and expensive. The track-changing method employing a number of magnetic heads with electrical head-switching means is undesirable in cases where the heads are relatively expensive and the multiplicity of the magnetic heads used has correspondingly increased the danger of trouble.

In recognition of the difficulties in the prior art, the present invention has for its primary object to provide for a magnetic tape recording and reproducing system operable at relatively high speeds a tape control device which is simple, relatively inexpensive and satisfactory to the particular recording and reproducing purpose.

Another object of the present invention is to provide means for automatically changing the direction of rotation of the capstan motor when the magnetic tape assumes a predetermined position in its travel for a tape control device of the character described, which includes as its major components photoelectric means for detecting said predetermined tape position, a small-sized control motor to be started by the electrical signal output of said detecting means, cam means operably connected with said motor and switching means operable by said cam means.

A further object of the present invention is to provide a control device of the character described which comprises means for simultaneously changing the direction of rotation of the capstan motor, and the motors for driving the takeup and payoff reels for the magnetic tape in an effective manner.

Yet another object of the present invention is to provide a control device of the character described which comprises means for changing the position of the magnetic heads relative to the record tracks on the magnetic tape by said cam means.

A further object of the present invention is to provide a device of the character described which comprises an ingenious mechanism for changing the path of tape travel relative to the magnetic heads fixed to a base plate by cam means of the device.

A still further object of the present invention is to provide a device of the character described an ingenious mechanism for changing the position of the magnetic heads relative to the fixed path of tape travel by cam means of the device.

Another object of the present invention is to provide for a device of the character described a method of successively changing the positional relation between the magnetic head and the record tracks on the magnetic tape by said cam means in a predetermined sequence.

A further object of the present invention is to provide a device of the character described which comprises means for successively changing the positional relation between the magnetic head and the record tracks on the magnetic tape by said cam means in a predetermined sequence and automatically terminating the tape travel when the magnetic head is positioned on a particular track on the magnetic tape.

A still further object of the present invention is to provide in a system of the character described and comprising said control device operable to reverse the direction of tape travel and to change the relative position between the magnetic tape and the magnetic head, means for causing said control device to start operation not only upon the electrical signal obtainable from said photoelectric detecting means but also upon an electrical signal as obtained by manual operation.

These and other objects, features and advantages of the present invention will become apparent from the following detailed description when taken in conjunction with the accompanying drawings, which illustrate a few preferred embodiments of the present invention and in which.

Figures 1, 2, 3:
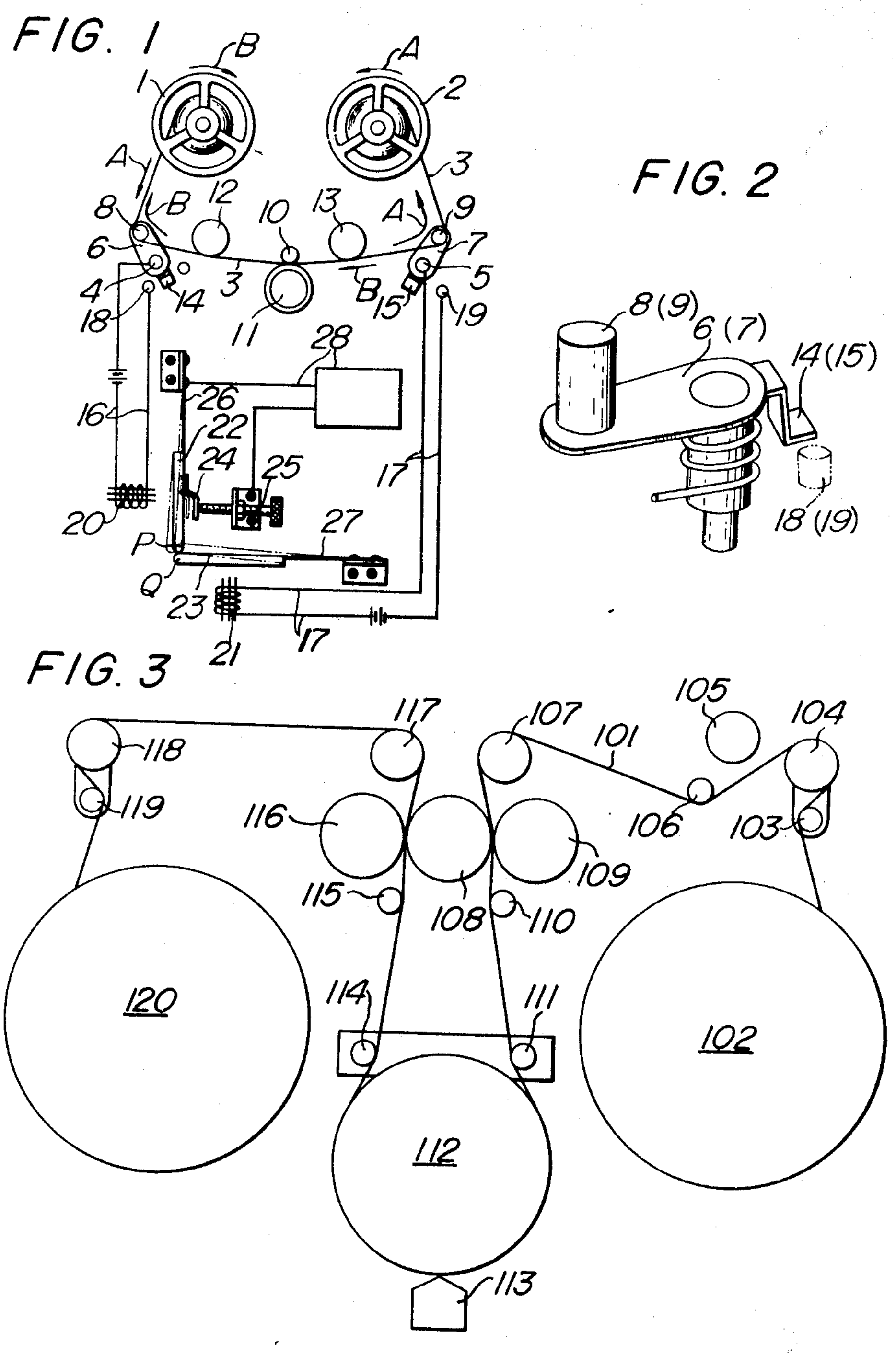
FIG. 1 is a schematic illustration of one example of the control device used in conventional magnetic recording and reproducing systems.
FIG. 2 is an enlarged perspective view showing the tension switch in the device of FIG. 1.
FIG. 3 is a schematic plan view showing one embodiment of the present invention.

The inventive system shown in FIG. 3 and the following figures includes a control device for use in magnetic tape recording and reproducing systems operable at relatively high tape speeds and which is simple and inexpensive, satisfactorily serving the purpose intended.

Though conventional devices have been described hereinbefore in more or less detail, to describe the prior art in further detail will help understanding the principles of the present invention, which will be described later in more detail.

Description will now be made on a typical example of conventional devices with reference to FIGS. 1 and 2.

In this example, each time when the magnetic tape fixed at its opposite ends to the payoff and takeup reels is wound up or reaches the end of its travel and thus its tension is increased, a changing mechanism is operated under the increased tape tension to reverse the direction of tape travel, thus enabling reciprocatory movement of the magnetic tape.

Referring to FIGS. 1 and 2, reels 1 and 2 are provided to which the respective ends of a magnetic tape 3 is fixed. The magnetic tape 3 is extended past guide pins 8 and 9 formed on respective tension switches or levers 6 and 7 which are resiliently rockable about their respective axes 4 and 5. Intermediate the switches 6 and 7 are arranged a capstan 10 and a cooperating pinch roller 11 to engage the magnetic tape 3 therebetween and magnetic heads 12 and 13 which are alternately operable as the tape is moved in reciprocation. The tension switches 6 and 7 include respective contact pieces 14 and 15, which are cooperable with respective contacts 18 and 19 to open and close electromagnetic circuits 16 and 17 upon rocking movement of the respective tension switch mechanisms (6, 7). Electromagnets 20 and 21 are inserted in the respective electromagnetic circuits 16 and 17 with their axes extending at right angles to each other. Armature pieces 22 and 23 operable under the attraction of the respective electromagnets 20 and 21 are also arranged so as to extend substantially at right angles to each other. The armature pieces 22 and 23 are carried on respective resilient strips 26 and 27 fixed at one end, as illustrated, and are normally positioned apart from the respective electromagnets 20 and 21. Also, the armature pieces 22 and 23 have such respective lengths that their free ends P and Q are engageable with each other, as shown.

Carried on the armature 22 is a contact finger 24 which is normally in contact with an adjustable contacting member 25. The contact finger 24 on the armature 22 and the contacting member 25 together form a switching mechanism for a circuit 28 including means for reversing the motors arranged to drive the capstan 10 and reels 1 and 2 and switching means for alternately energizing the magnetic heads 12 and 13. It is now assumed that the reel 2 is driven to move the magnetic tape 3 in the direction of the arrow A with the magnetic head 12 energized to reproduce one of the recorded tracks of the tape 3 and that the circuit is in its closed state. In this case, when the tape 3 is wound up on the reel 2 at the end of the tape travel, that portion of the tape 3 which extends between the reel 1 and capstan 10 is subjected to an extreme tension to rock the tension switch lever 6 in a direction to place the contact piece 14 thereon into contact with the adjacent contact 18. As the result, the electromagnet 20 is energized to attract the armature 22 thereby to move the contact finger 24 apart from the contacting member 25, allowing the armature 23 to spring back away from the adjacent electromagnet 21 under the resilience of the resilient strip 27 carrying the armature 23. In this manner, the free end portion Q of the armature 23 is positioned to engage the free end portion P of the armature 22 attracted to the electromagnet 23, as indicated by the dot-dash lines in FIG. 1. The circuit 28 when opened upon attraction of the armature 22 operates to reverse the mechanisms including the motors for driving the capstan 10 and the reels and thus the reel 1 and capstan 10 are started to turn in the opposite direction to drive the tape 3 in the direction of the arrow B. Simultaneously with this, the magnetic head 13 is energized to reproduce another record track on the tape in continuation to the track previously reproduced through the magnetic head 12.

Subsequently, when the tape is wound up in the direction of the arrow B, this time that portion of the tape which extends between the reel 2 and capstan 10 is tensioned to operate the adjacent tension switch 7 so as to energize the electromagnet 21, which thus attracts the armature 23 to disengage its free end portion Q from the adjacent end P of the armature 22. Thus, the armature 22 is allowed to separate away from the associated electromagnet 20 now de-energized and the contact finger 24 carried on the armature 22 is brought into contact with the contacting member 25 to close the circuit, which again reverses the tape drive system. In this manner, it will be recognized that the magnetic tape carrying a number of record tracks can be reproduced in a continuous fashion as it is reciprocated.

In the above-described example of conventional system, the changing mechanism operates when the tape tension is increased after the tape has been wound up on the take-up reel at the end of each tape travel. Therefore, in cases where *k* relatively high tape speeds are employed, for example, in recording and reproducing signals of relatively wide bandwidths such as a video signal in television by means of a magnetic head fixed to a base plate, it will be readily understood that a more or less length of time must elapse after the operation of the changing mechanism and before the direction of tape travel is actually reversed. In the illustrated system, therefore, the tape is subjected to an extraordinarily large tension and this has involved the danger of causing an irreversible elongation or a breakage of the magnetic tape.

Moreover, magnetic heads used in the recording and reproduction of signals of relatively wide bandwidth are generally considerably expensive and are required in a number corresponding to that of the parallel record tracks formed on the tape widthwise thereof, increasing the cost of the entire recording and reproducing system to that extent. Also, the successive use of such plurality of magnetic heads involves deficiencies that the signals reproduced inevitably tend to be nonuniform in quality because of the variation in performance of the magnetic heads and that the rate of trouble naturally increases with the number of heads.

Another conventional device for tape control has included a contact type detector cooperable with a strip of electroconductive material adhering to an appropriate location of the magnetic tape to reverse the direction of tape travel. This device has also been unsatisfactory from the standpoint of life of service and reliability in cases where the tape speed is relatively high.

Additionally, with sophisticated high-speed tape recorders used, for example, in electronic computer systems, tape pools of the vacuum type or zigzag path type have been employed to reduce the time required for the automatic reversal of the direction of tape travel but such devices are generally complicated in structure and highly expensive.

In contrast to the prior art devices described above, the device of the present invention for reversal of the direction of tape travel and for track changing is advantageously usable with commercial type video tape recorders employing the tape speed of, say, 3 meters per second and other magnetic recording and reproducing systems of simple structure in which a time length of the order of one second is permissible as the time required to complete the reversal of the direction of tape travel. One preferred embodiment of the present invention will next be described with reference to FIGS. 3 to 5.

Figures 5, 8, 9, 10:
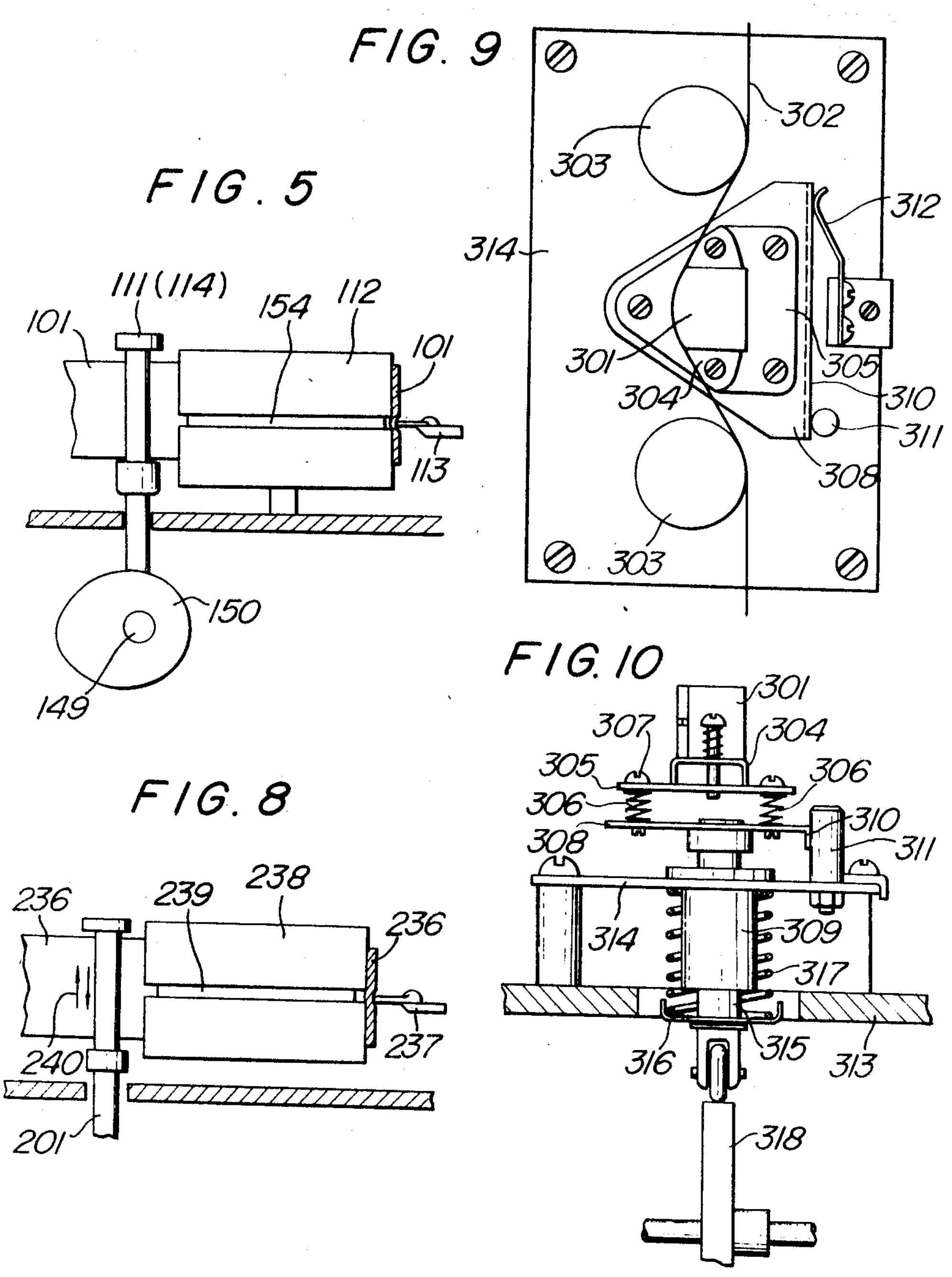
FIG. 5 is a cross-sectional view of the record track changing mechanism of the embodiment shown in FIG. 3.
FIG. 8 is a fragmentary cross-sectional view of the top portion of the mechanism shown in FIG. 6.
FIG. 9 is a top view of yet another form of record-track changing mechanism usable in the system of the present invention.
FIG. 10 is a cross-sectional view of the mechanism shown in FIG. 9.

Referring first to FIG. 3, the magnetic tape 101 extends from a reel 102 to another reel 120. Assuming that the tape is now being wound on the latter reel 120, it passes a number of component members in the following order. That is, the tape passing a tension arm 103, and an idler 104 proceeds across the front side of a photoelectric detector 105, passes a guide post 106, an idler 107 to proceed between a capstan 108 and a cooperating pinch roller 109 and then passes a guide post 110 and a vertically movable guide post 111 and proceeds around a roller 112, which has a peripheral groove 154 extending in parallel to the path of tape travel, as shown in FIG. 5, and cooperates with a magnetic head 113 arranged adjacent to the roller 112 with the tape extending therebetween. The tape 101 further proceeds past another vertically movable guide post 114, a further guide post 115 and between another capstan 108 and a cooperating pinch roller 116 and passes idlers 117 and 118 and another tension arm 119 to be wound on the reel 120. Upon reversal of the direction of tape travel, the magnetic tape obviously starts to proceed along the path described in the opposite direction.

The magnetic tape 01 carries on its opposite end pormagnetic tape and of reversing the direction of its travel will next be described with reference to FIG. 4.

The magnetic tape 101 carries on its opposite end portions respective reflecting tape strips 121 each having a length of several centimeters and bonded to the tape at a location spaced several meters from its adjacent end. Terminals 122 and 123 are arranged to receive a DC power supply. The photoelectric detector 105 includes a lamp 124, a phototransistor 125, a transistor 126 and three resistors 155, 156 and 157. When the magnetic tape 101 being wound on the reel 120 approaches the end of its travel, one of the reflecting strips 121 passes over the front side of the detector 105 to reflect the light from the lamp 124 to illuminate the phototransistor 125.

The output of the phototransistor 125 thus energized is amplified by the transistor 126 and operates a first relay 127, which is thus held in operative position with its secondary circuit contact 128 closed. As long as the first relay 127 is held in this position, an AC power supplied to terminals 130 and 131 is fed through another secondary circuit contact 129 of the relay 127 to a synchronous motor 132. The synchronous motor 132 thus rotates to drive a first cam 134 by way of a first control shaft 133 integral with the output shaft of the motor. The first cam 134 is so designed as to keep pressing a first switch 136 until a second cam 135 being driven also through the first control shaft 133 acts to close a second switch 137. Because of this, it will be readily understood that the synchronous motor 132 is held connected with the AC power source through the second switch 137 to continue to rotate even after the holding circuit for the first relay 127 has been opened with operation of the second switch 137.

In the meantime, a third cam 138 being driven through the first control shaft 133 acts upon a third switch 139 so that a DC current is supplied from terminals 141 and 142 to a second relay 140 through the third switch 139 and a fourth switch 143 to operate the second relay. The second relay 140 includes secondary circuit contacts 146 connected to the circuits of reel and capstan-driving motors (not shown), respectively, so that upon operation of the second relay 140, the polarity of the input voltage to the reel driving motor and the direction of rotation of the captstan-driving motor are reversed thereby to reverse the direction of travel of the magnetic tape 101.

A second control shaft 149 is operatively connected with the first control shaft 133 through the intermediary of intermeshing gears 147 and 148 having the gear ratio of 1 to 2. An eccentric disc cam 150 is mounted on the second control shaft 149 to serve the purpose of vertically displacing the guide post 111 and 114 upon reversal of the direction of tape travel thereby to change the vertical position of the magnetic tape 101 relative to the magneic head 113 for the changing of the record tracks.

On this occasion, the direction of travel of the magnetic tape 101 which has been proceeding in the direction to be wound on the reel 120 is reversed so that the tape is wound back on the reel 102. It is to be noted that, after the direction of tape travel has once been reversed, the tape 101 is continuously wound on the reel 102 even though the reflecting tape strip 121 bonded to the magnetic tape 101 passes again over the front side of the photoelectric detector 105. Namely, the reversing time of the capstan-driving motor and the torque output of the reel driving motor are so selected that, even when the reflecting strip 121 passes in its return movement over the front side of the photoelectric detector 105, the synchronous motor 132 can continue its normal operation and hence the travel of the magnetic tape 101 in the direction to be wound on the reel 102 despite of the operation of the photoelectric detector 105 with the second switch 137 held in its open position.

Subsequently, upon completion of the above-described sequential operation, the second cam 135 operates to open the second switch 137 to interrupt the rotation of the synchronous motor 132, when the cam 134 is prepared for the next operation, depressing the first switch 136. In this connection, the output of the synchronous motor 132 is reduced in speed by gear means to 4 r.p.m. Thus, the output shaft 133 makes half a revolution in a period of 7.5 seconds for each cycle of automatic reversal and track changing.

It is desirable that the magnetic tape 101 be brought to rest after the direction of tape travel has been reversed a number of times corresponding to the number of record tracks arranged on the magnetic tape 101 widthwise thereof and thus the track initially traced has again been selected. To this end, there is provided a fifth switch 145 (FIG. 4) which is operable by a fourth cam 151 mounted on the second control shaft 149 and a manually operable switch 144 is connected in series with the fifth switch 145 for opening a relay circuit 152–153, which is operable to open and close the power supply circuit for the drive motors.

Figure 4:
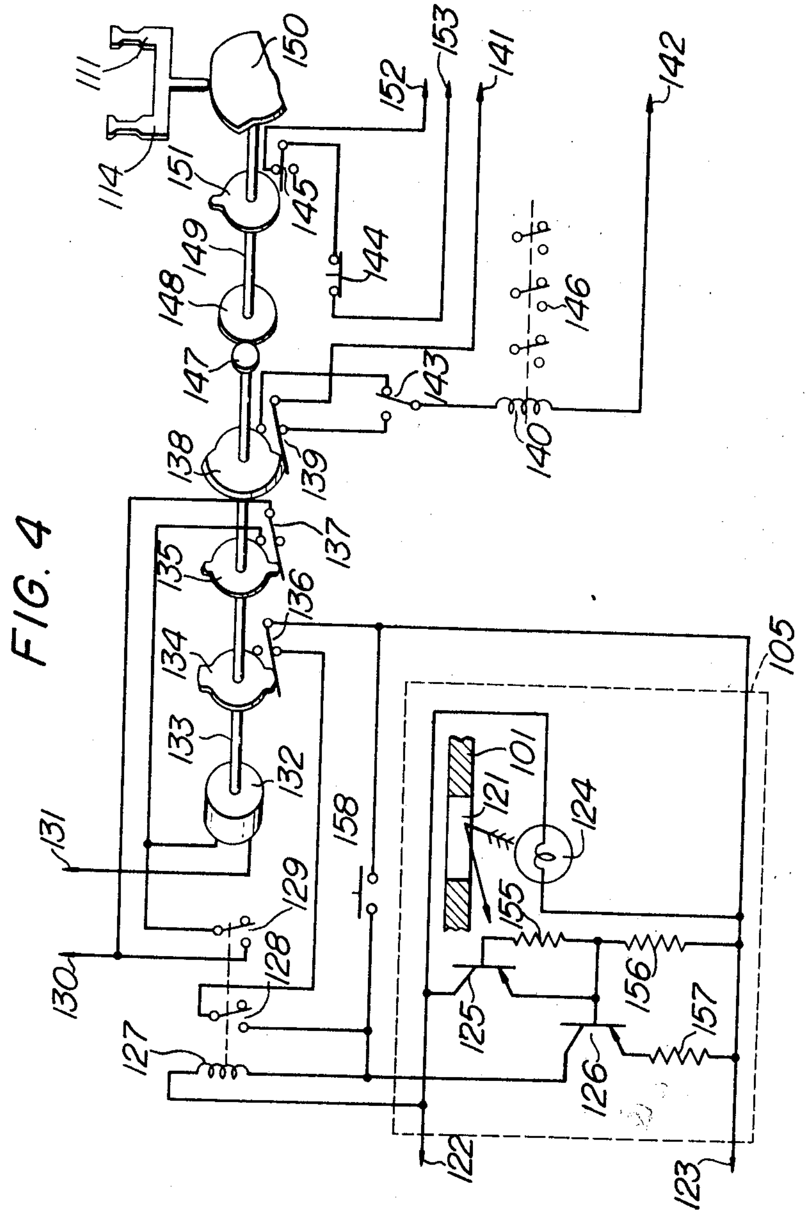
FIG. 4 is an electrical circuit diagram of the control system of the embodiment shown in FIG. 3.

Since the direction of travel of the magnetic tape 101 is reversed by transferring the secondary circuit contacts 146 of the second relay 140, as described hereinbefore, depression of the fourth switch 143 when the second relay 140 is in its operative position the second relay 140 is deenergized while depression of the fourth switch 143 when the second relay 140 is in its deenergized state the second relay 140 is operated in case the fourth switch 143 is connected with the third switch 139 as shown in FIG. 4. Thus, in this case, the direction of tape travel can be reversed without effecting any track changing by depression of the fourth switch 143 even when the magnetic tape 101 is travelling in either direction.

As will be appreciated from the foregoing, a relatively inexpensive magnetic recording and reproducing system can be obtained according to the present invention which is capable of automatically reversing the direction of tape travel and changing the record tracks in a relatively inexpensive and effective manner, incorporating, among others, a single small-sized motor for automatically reversing the direction of travel of the magnetic tape running at a relatively high speed, a single photoelectric detector capable of detecting a reversing signal for either direction of tape travel and a vertically movable tape guide structure for track changing. Though in the illustrated embodiment the track changing is effected by varying the path of tape travel with the magnetic head fixed in a position on the base plate, the same purpose can also be served satisfactorily by vertically displacing the magnetic head relative to the path of tape travel which in this case remains unchanged.

Also, an appropriate manual device such as a push button 158 (FIG. 4) may be employed in addition to the photoelectric detector to generate at any desired time during the tape travel an electrical signal which can serve the same purpose as the one obtainable by the photoelectric detector. By this means, it will be appreciated that the reversal of the direction of tape travel and the track changing can be effected at any desired time irrespective of the position of the magnetic tape during its travel.

Figure 6:
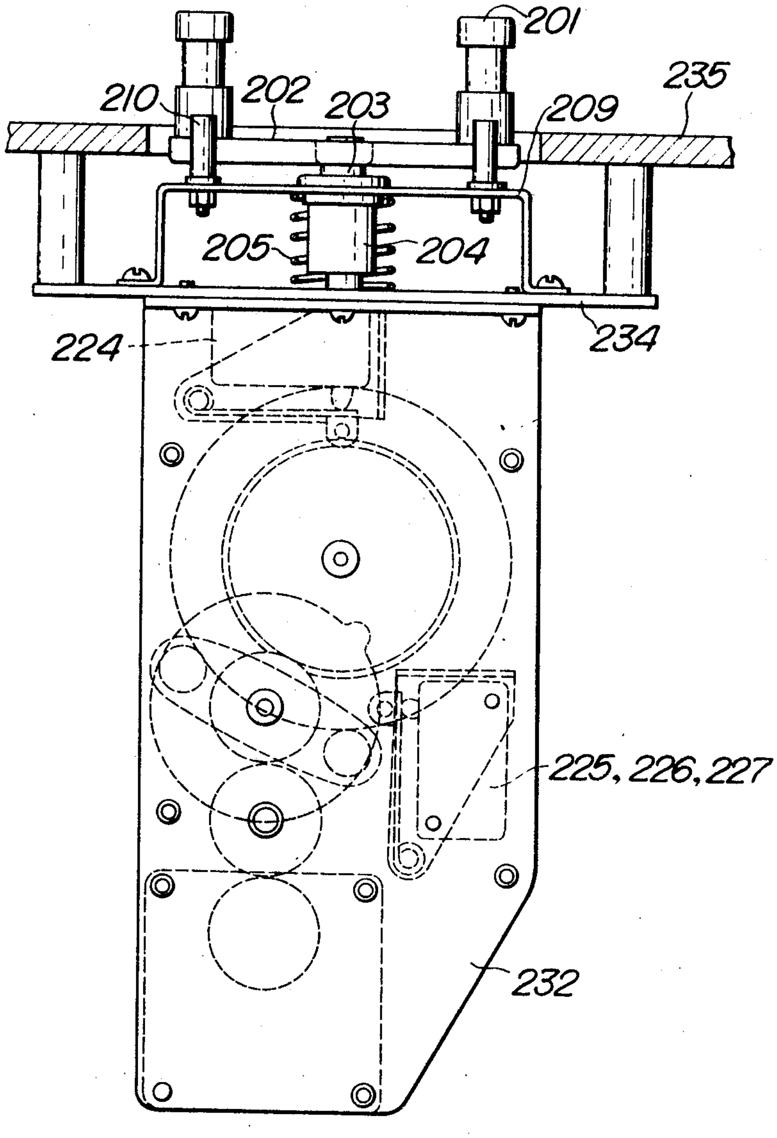
FIG. 6 is a front view of another form of record track changing mechanism usable in the inventive system.
Figure 7:
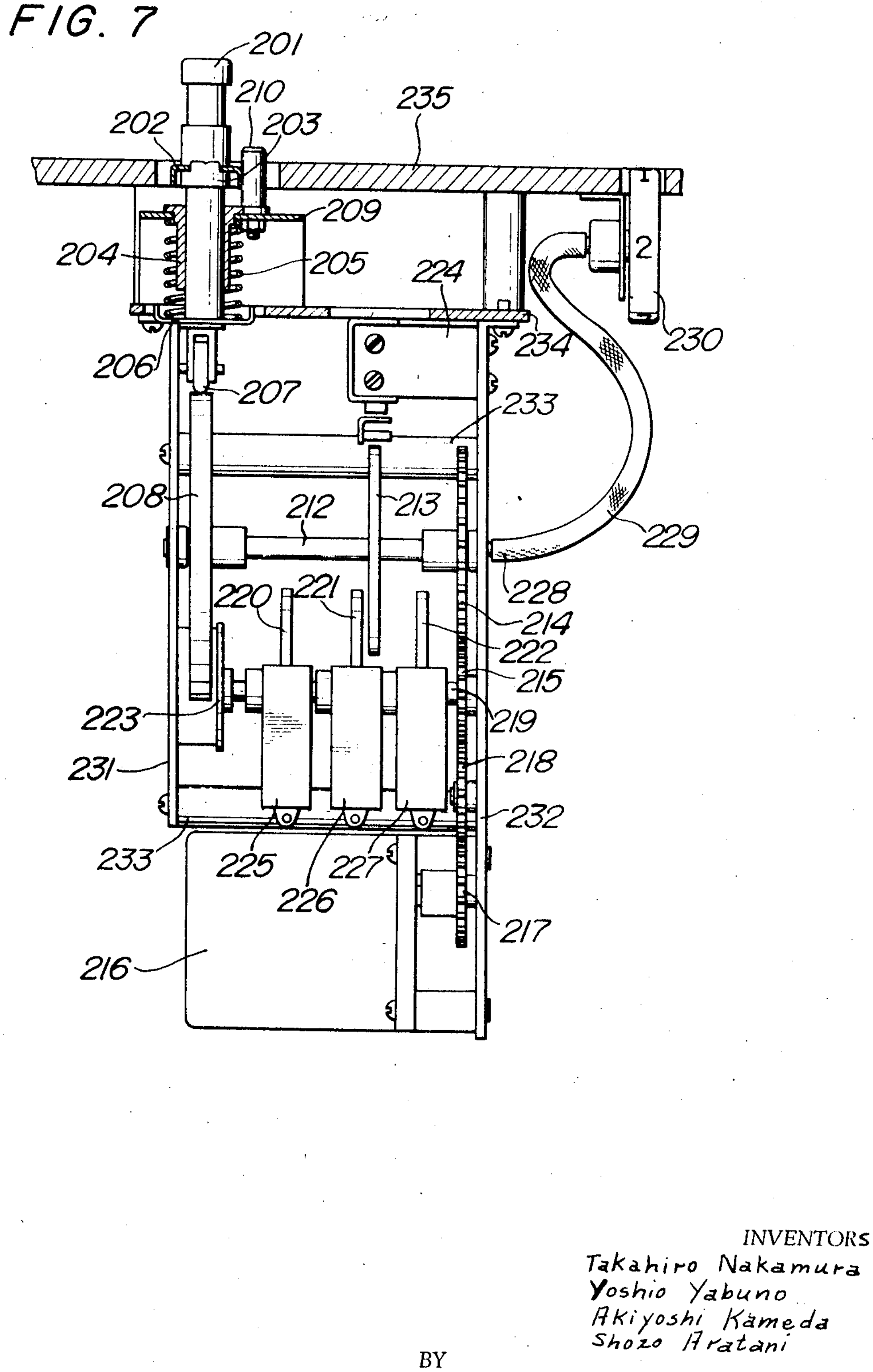
FIG. 7 is a side view of the mechanism shown in FIG. 6.

One example of track-changing mechanism usable in the present invention will now be described with reference to FIGS. 6 to 8.

In this example, the tape guide posts 201 are carried by a two-armed lever 202 which is integral with a vertical rod 203. Carried by the rod 203 at its bottom is a roller 207 which is held in rolling contact with a main cam 208. The vertical rod 203 is slidably fitted in a bearing 204 fixed to a first base plate 209 with a spring 205 arranged between the bearing 204 and a spring seat 206 fixed to the rod 203. The main cam 208 is 4 mm. thick having a maximum diameter of 60 mm. and is rotatable to cause vertical sliding movement of the rod 203.

A restraining pin 210 extends upwardly from the base plate 209 for holding the lever 202 against rotation. The main cam 208 is mounted on a shaft 212 of approximately 5 mm. diameter. The shaft 212 also carries a disc cam 213 which is 2 mm. thick and 40 mm. in maximum diameter and a gear 214 which is 2 mm. thick and has a pitch circle diameter of 40 mm., a module of 0.5 and teeth eighty in number. The disc cam 213 and gear 214 are apparently rotatable in synchronism with the main cam 208. Arranged in meshing engagement with the gear 214 is a gear 215 of the same width and module having a pitch circle diameter of 20 mm. and thus having forty teeth. The gear 215 is driven from a pinion 217 mounted on the 3 mm. diameter output shaft of a motor 216 through the intermediary of an intermediate gear 218 of the same size as the pinion 217, which is 2 mm. thick, having a pitch circle diameter of 20 mm., a module of 0.5 and thus forty teeth. The motor 216 operates at a speed of 4 r.p.m. The gear 215 is mounted on a 4 mm. diameter shaft 219, which also carries disc cams 220, 221 and 222 of 40 mm. maximum diameter and is mounted at the opposite end in a bearing 223. Switches 224, 225, 226 and 227 are arranged opposite to the respective disc cams 213, 220, 221 and 222 and each of them is operable by the associated one of the disc cams as it rotates.

Connected to the end of the cam shaft 212 remote from the main cam 208 is a flexible shaft 229 which is connected at the other end with a rotary type indicator wheel 230 having an outside diameter of approximately 30 mm. and a width of approximately 8 mm. The indicator wheel carries a series of appropriate numerical indicia or a scale and is rotatable in synchronism with the main cam 208.

Side plates 231 and 232 of 1.2 mm. thickness are held spaced by a predetermined distance of 52 mm. by means of braces 233 having a diameter of approximately 6 mm. to accommodate all the essential components of the track-changing mechanism between the side plates. A second base plate 234 carries on one side the mechanism for vertically displacing the guide posts 201 of approximately 8 mm. diameter and on the other side mechanisms including cam switches and is fitted to a main or third base plate 235, approximately 6 mm. thick, of the machine.

The functioning and operation of the apparatus constructed in the manner described above will next be explained.

When the travelling magnetic tape approaches its end of travel, the photoelectric detector described hereinbefore is operated to produce an output signal which is employed to start the motor 216. Rotation of motor 216 causes rotation of the cam shaft 219 by way of the pinion 217, intermediate gear 218 and gear 215. As the result, the disc cams 220, 221 and 222 mounted on the cam shaft 219 act upon the switches 225, 226 and 227 arranged opposite to the respective disc cams. It is to be noted that this group of switches serves the function of controlling the automatic reversal of the magnetic tape for the respective record tracks thereon. The main cam shaft 212 is driven to rotate at a speed reduced relative to the cam shaft 219 in the predetermined gear ratio between the mating gears 215 and 214. Thus, the main cam 208 and disc cam 213 both rotate with rotation of disc cams 220, 221 and 222 on the cam shaft 219.

The main cam 208 has a surface of inclination corresponding to the number of tracks of the magnetic tape for the purpose of vertically displacing the rod 203 each time when the cam assumes one of its predetermined angular positions. The switch 224 is disposed opposite to the disc cam 213 so as to be actuated by the disc cam to open the switch for the motor 216 just when the main cam 208 has made one revolution to complete the cycle of operation of the machine. Also, as the main cam 208 rotates, the rotary type indicator wheel 230 connected to one end 228 of the main cam shaft 212 by way of the flexible shaft 229 is rotated to indicate the angular position of the main cam 208 by means of the scale or series of indicia carried on the indicator wheel.

As the main cam shaft 212 is driven to rotate, the roller 207 held in rolling contact with the peripheral surface of the main cam 208 forces the rod 203 vertically upwardly against the resilience of the spring 205. In this manner, the tape guide posts 201 are vertically moved by a distance required to displace the magnetic tape vertically or widthwise thereof since they are carried on the lever 202 integrally fixed to the rod 203, as described hereinbefore.

The guide posts 201 are usable to advantage for displacing the magnetic tape in either direction indicated by the arrows 240 in FIG. 8 in correspondence with the predetermined quantity of record, for example, in the case illustrated where the magnetic tape 236 travels about a rotating member 237 while being fitted into a peripheral groove 239 formed therein under the pressure of the magnetic head 237.

A second example of track-changing mechanism according to the present invention will next be described with reference to FIGS. 9 and 10.

In this example, a magnetic head 301 is mounted on a first base plate 304 and the magnetic tape 302 is driven past idlers 303 having an outside diameter of approximately 60 mm. The first base plate 304 is supported by a second base plate 305, which in turn is supported on a third base plate 308 by way of a set of springs 306 anchored to the second base plate by screw studs 307. The third base plate 308 is fixed to the top of a rod 315 which extends downwardly through a bearing member 309 for vertical sliding movement therein. One edge portion 310 of the third base plate 308 is bent downwardly and, as shown, is in contact with a guide post 311 extending upwardly from a fourth base plate 314 and with a spring 312 anchored thereto. The bearing member 309 is firmly secured to the fourth base plate 314, which is supported by a fifth base plate 313.

Secured to the vertical rod 315 adjacent to its bottom end is a spring seat 316 which carries thereon a coiled spring 317. This spring is secured at its top to the underside of the fourth base plate 314 and functions to bias the rod 315 at all times downwardly. Arranged below the bottom end of the rod carrying a roller is a cam 318 which is operable as it is rotated to vertically move the rod 315 by a distance corresponding to the predetermined number of tracks on the magnetic tape 302.

Though a few embodiments of the present invention have been described and shown herein, it will be apparent to those skilled in the art that many changes and modifications can be made without departing from the spirit and scope of the invention.

What is claimed is:

1. A magnetic recording and reproducing system of the type including a magnetic tape, a magnetic head, and means for moving said magnetic tape relative to said magnetic head to produce a plurality of record tracks on said magnetic tape in parallel with its direction of travel, said system comprising means for photoelectrically detecting a marking carried at a predetermined location on said magnetic tape to generate an electrical signal, a motor arranged to be started by said electrical signal, cam means arranged to be driven by said motor, a first base plate having said magnetic head fixed thereto, a second base plate with means for arranging said first base plate on said second base plate, a third base plate with a first spring means disposed between said second and third base plates, a fourth base plate carrying a guide post and a second spring means, said third base plate including a bent edge portion positioned in contact with said guide post and said second spring means, a fifth base plate arranged opposite to said fourth base plate with a bearing and a third spring means interposed therebetween, a vertical rod fitted in said bearing and extending through said fourth and fifth base plates, a spring seat fixed to the bottom portion of said rod to receive said third spring means, said rod being fixed at its top to said third base plate and held at the bottom in contacting engagement with said cam means for vertical movement against the bias of said third spring means upon rotation of said cam means, and means operable upon vertical displacement of said rod to change the position of said magnetic head relative to said record tracks on said magnetic tape.

2. A magnetic recording and reproducing system of the type including a magnetic tape, and means to produce a plurality of record tracks on said magnetic tape parallel to its direction of travel by a magnetic head, said system comprising means for indirectly generating an electrical signal in response to a predetermined position of said magnetic tape, a relay connected to be excited by said generated electrical signal, a motor connected to be started by the operation of said relay, cam means arranged to be driven by said motor, means for holding said relay in operation by switching means controlled by said cam means and a secondary circuit of said relay for a time shorter than a period of one operation cycle of said cam means, means for supplying power to said motor by another switching means controlled by said cam means and for automatically interrupting the supply of the power to said motor upon the termination of one operation cycle of said cam means, and control means operable by said cam means.

3. A magnetic recording and reprdoucing system of the type including a magnetic tape, a capstan motor for driving the magnetic tape, and means to produce a plurality of record tracks on said magnetic tape in parallel to its direction of travel by a magnetic head, said system comprising means for photoelectrically detecting a marking carried at a predetermined location on said magnetic tape, a relay connected to be excited by an electrical signal generated by said detecting means, a motor connected to be started by the operation of said relay, cam means arranged to be driven by said motor, means for holding the operation of said relay by switching means controlled by said cam means and a secondary circuit of said relay for a time shorter than a period of one operation cycle of said cam means, means for supplying power to said motor by another switching means controlled by said cam means and automatically interrupting the supply of the power to said motor upon the termination of one operation cycle of said cam means, and means associated with said cam means to change the direction of rotation fo the capstan and motor of the system.

4. A magnetic recording and reproducing system of the type including a magnetic tape, a capstan motor for driving the magnetic tape, two reels for rewinding or forwarding the tape, two motors for driving said reels, and means to produce a plurality of record tracks on said magnetic tape in parallel to its direction of travel by a magnetic head, said system comprising means for photoelectrically detecting a marking carried at a predetermined location on said magnetic tape, a relay connected to be excited by an electrical signal generated by said detecting means, a motor connected to be started by the operation of said relay, cam means arranged to be driven by said motor, means for holding the operation of said relay by switching means controlled by said cam means and a secondary circuit of said relay for a time shorter than a period of one operation cycle of said cam means, means for supplying power to said motor by another switching means controlled by said cam means and automatically interrupting the supply of the power to said motor upon the termination of one operation cycle of said cam means, and means associated with said cam means to control the capstan motor and motors for driving the tape payoff and takeup reels of the systems so as to reverse the direction of travel of said magnetic tape.

5. A magnetic recording and reproducing system of the type including a magnetic tape, and means to produce a plurality of record tracks on said magnetic tape in parallel to its direction of travel by a magnetic head, said system comprising means for photoelectrically detecting a marking carried at a predetermined location on said magnetic tape, a relay connected to be excited by an electrical signal generated by said detecting means, a motor connected to be started by the operation of said relay, cam means arranged to be driven by said motor, means for holding the operation of said relay by switching means controlled by said cam means and a secondary circuit of said relay for a time shorter than a period of one operation cycle of said cam means, means for supplying power to said motor by another switching means controlled by said cam means and automatically interrupting the supply of the power to said motor upon the termination of one operation cycle of said cam means, means operable by said cam means to reverse the direction of travel of said magnetic tape, and means operable by said cam means to change the position of said record tracks on said magnetic tape relative to the magnetic head.

6. A magnetic recording and reproducing system of the type including a magnetic tape, and means to produce a plurality of record tracks on said magnetic tape in parallel to its direction of travel by a magnetic head, said system comprising means for photoelectrically detecting a marking carried at a predetermined location on said magnetic tape, a relay connected to be excited by an electrical signal generated by said detecting means, a motor connected to be started by the operation of said relay, cam means arranged to be driven by said motor, means for holding the operation of said relay by switching means controlled by said cam means and a secondary circuit of said relay for a time shorter than a period of one of operation cycle of said cam means, means for supplying power to said motor by another switching means controlled by said cam means and automatically interrupting the supply of the power to said motor upon the termination of one operation cycle of said cam means, means operable by said cam means to reverse the direction of travel of said magnetic tape, and means operable by said cam means to vertically move said magnetic tape in such a manner that the resulting change in position of said record tracks on said magnetic tape relative to said magnetic head is smoothly effected in a predetermined sequence.

7. A magnetic recording and reproducing system of the type including a magnetic tape, and means to produce a plurality of record tracks on said magnetic tape in parallel to its direction of travel by a magnetic head, said system comprising means for photoelectrically detecting a marking carried at a predetermined location on said magnetic tape, a relay connected to be excited by an electrical signal generated by said detecting means, a motor connected to be started by the operation of said relay, cam means arranged to be driven by said motor, means for holding the operation of said relay by switching means controlled by said cam means and a secondary circuit of said relay for a time shorter than a period of one operation cycle of said cam means, means for supplying power to said motor by another switching means controlled by said cam means and automatically interrupting the supply of the power to said motor upon the termination of one operation cycle of said cam means, means operable by said cam means to reverse the direction of travel of said magnetic tape, means operable by said cam means to vertically move said magnetic tape in such a manner that the resulting change in position of said record tracks on said magnetic tape relative to said magnetic tape relative to said magnetic head is effected in a predetermined sequence, and means for automatically interrupting the travel of said magnetic tape when a predetermined one of said record tracks on said magnetic tape is selected by said change in position of said record tracks relative to said magnetic head.

References Cited

UNITED STATES PATENTS

| | | | |
|---|---|---|---|
| 2,275,961 | 3/1942 | Heller | 179—100.2 |
| 2,468,198 | 4/1949 | Heller | 179—100.2 |
| 2,938,962 | 5/1960 | Konins et al. | 179—100.2 |
| 2,971,716 | 2/1961 | Sampson | 179—100.2 |
| 3,080,456 | 3/1963 | Osborne et al. | 179—100.2 |

BERNARD KONICK, Primary Examiner

J. R. GOUDEAU, Assistant Examiner

U.S. Cl. X.R.

179—100.2; 242—188